United States Patent [19]

Amankonah et al.

[11] Patent Number: 5,516,543
[45] Date of Patent: May 14, 1996

[54] OIL-COATED MICROPARTICULATED GELLAN GUM

[75] Inventors: Ofori J. Amankonah; Raymond C. Valli; Dana A. Zdanis, all of San Diego, Calif.

[73] Assignee: Monsanto Company, St. Louis, Mo.

[21] Appl. No.: 346,981

[22] Filed: Nov. 30, 1994

Related U.S. Application Data

[63] Continuation of Ser. No. 83,954, Jun. 25, 1993.

[51] Int. Cl.⁶ ..................................................... A23L 1/054
[52] U.S. Cl. ............................. 426/573; 426/96; 426/804
[58] Field of Search ............................. 426/96, 573, 804

[56] References Cited

U.S. PATENT DOCUMENTS

| | | | |
|---|---|---|---|
| 4,326,052 | 4/1982 | Kang et al. | |
| 4,326,053 | 4/1982 | Kang et al. | |
| 4,734,287 | 3/1988 | Singer et al. | |
| 4,822,534 | 4/1989 | Lencki et al. | |
| 4,911,946 | 3/1990 | Singer et al. | |
| 5,104,674 | 4/1992 | Chen et al. | 426/573 |
| 5,260,083 | 11/1993 | Brain et al. | 426/573 |
| 5,439,697 | 8/1995 | Gonzalez-Sanz | 426/572 |
| 5,456,937 | 10/1995 | Chalupa | 426/573 |

FOREIGN PATENT DOCUMENTS

91/19424  12/1991  WIPO.

OTHER PUBLICATIONS

Robert J. Swientek, Executive Director, Food Processing (Jun. 1990) "Microfluidizing: Technology Enhances Emulsion Stability".

*Primary Examiner*—Donald E. Czaja
*Assistant Examiner*—Curtis E. Sherrer

[57] ABSTRACT

The invention is oil-coated microparticulated gellan gum microparticles which are useful as a fat replacer, as an encapsulant and/or as a delivery system for food ingredients in low- or no-fat food matrix. The microparticles are substantially spherical and have particle sizes ranging between about 0.1–10 microns. Primarily, these microparticles have particle sizes ranging between 0.1–5.0 microns. The microparticles have a narrow size distribution, with about 70–80% ranging between the 0.1–5.0 micron size. The particles have a high degree of deformability and surface hydrophobicity.

15 Claims, 1 Drawing Sheet

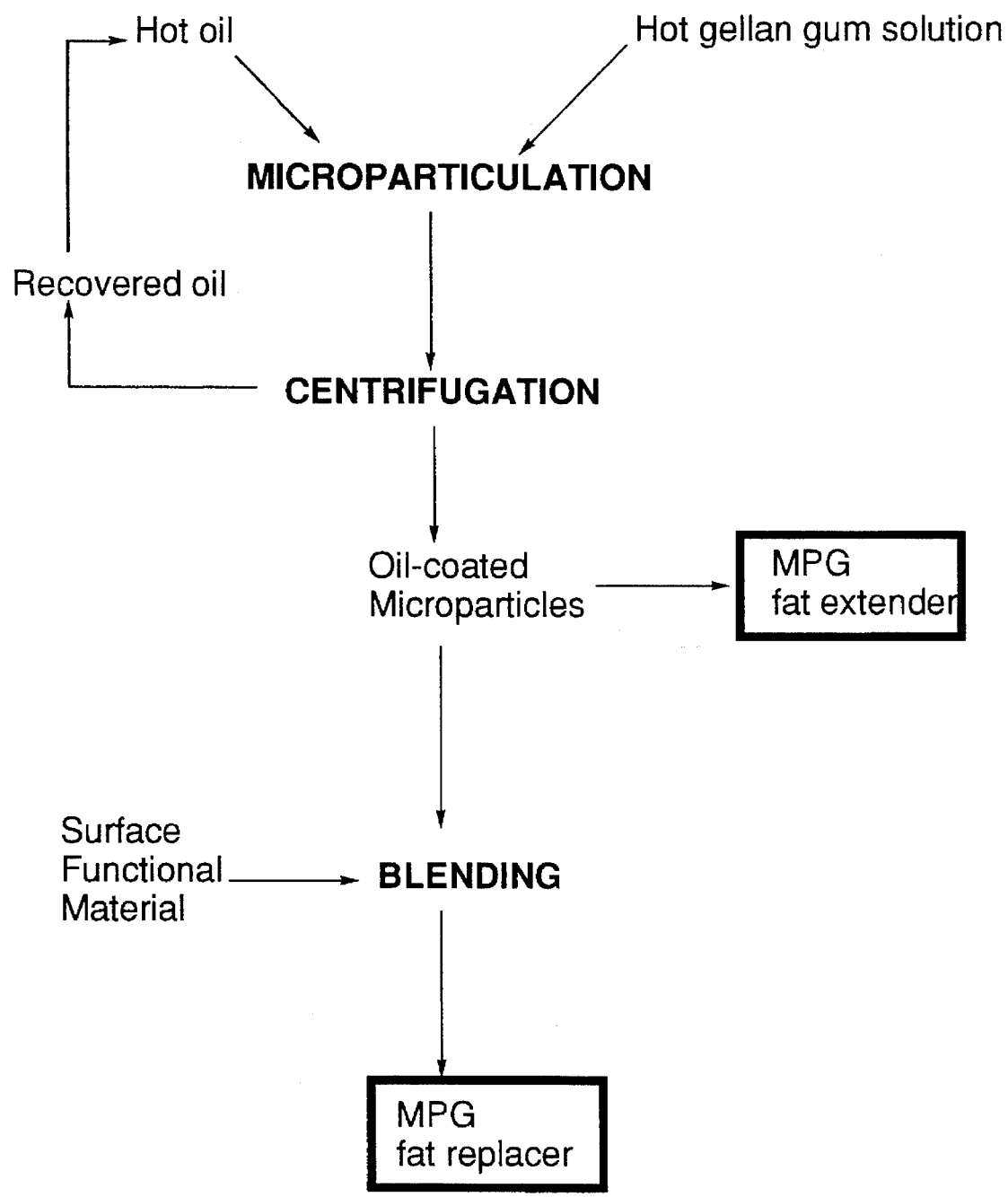

OIL-COATED MICROPARTICULATED GELLAN GUM

This is a continuation of application Ser. No. 08/083,954 filed on Jun. 25, 1993.

BACKGROUND OF THE INVENTION

Spiers et al., WO 9119424 describe alginate fat substitutes and a method for making them using a mixer and homogenizer. The substitutes are described as having a range of particle sizes between about 15 and 300 gm, and a mean particle size of about 96 μm.

Swientek, FOOD PROCESSING June 1990, pages 152–153, describes the use of a microfluidizer on finished products to provide stable emulsions, extended shelf life, and improved mouthfeel, of salad dressings, sauces and gravies, UHT milk, syrups, chocolate and malted drinks, flavor oil emulsions, high-butterfat dairy products, creams, yogurts, fillings, and icings.

SUMMARY OF THE INVENTION

The invention is oil-coated microparticulated gellan gum microparticles which are useful as fat replacers, as encapsulants and/or as delivery systems for food ingredients in low- or no-fat food matrix. The microparticles are substantially spherical and have particle sizes ranging between about 0.1–10 microns. Primarily, these microparticles have particle sizes ranging between 0.1–5.0 microns. The microparticles have a narrow size distribution, with about 70–80% ranging between the 0.1–5.0 micron size. The particles have a high degree of deformability and surface hydrophobicity.

BRIEF DESCRIPTION OF THE DRAWING

FIG. 1 is a process flow diagram illustrating the procedure for making oil-coated microparticulated gellan gum.

DETAILED DESCRIPTION OF THE INVENTION

The present invention includes a composition comprising substantially spherical oil-coated gellan gum microparticles having particle size diameters between about 0.1–10 microns. Preferably, the composition comprises between about 70–80% of the oil-coated gellan gum microparticles having particle size diameters between about 0.1–5.0 microns.

In another embodiment of the invention, the oil-coated gellan gum microparticles have one or more surface functional materials adhering to the oil coat. Preferably, these surface functional materials are selected from the group consisting of xanthan gum, propylene glycol alginate, and proteinaceous materials. More preferably, xanthan gum and propylene glycol alginate are used in combination as the surface functional materials.

The invention further comprises low-fat food products comprising about 5–25% oil-coated gellan gum microparticles, preferably about 10–15% oil-coated gellan gum microparticles.

The invention further comprises low-fat food products comprising about 5–25% oil-coated gellan gum microparticles, having one or more surface functional materials adhering to the oil coat, preferably about 10–15% oil-coated gellan gum microparticles, having one or more surface functional materials adhering to the oil coat.

The invention further comprises a process for preparing oil-coated gellan gum microparticles comprising:
  a) simultaneously introducing oil and gellan gum solution into a microfluidizer operated at a pressure between about 8,000 and 10,000 psi.;
  b) forming gellan gum microparticulates and coating the gellan gum microparticulates with oil; and
  c) removing excess oil. The invention also comprises the product produced by the process described above.

The invention further comprises a process for preparing oil-coated gellan gum microparticles, having one or more surface functional materials adhering to the oil coat, comprising:
  a) simultaneously introducing oil and gellan gum solution into a microfluidizer operated at a pressure between about 8,000 and 10,000 psi.;
  b) forming gellan gum microparticulates and coating the gellan gum microparticulates with oil to form an oil-coated microparticulated gellan gum composition;
  c) removing excess oil; and
  d) applying a surface functional material to the oil coating by blending oil-coated microparticulated gellan gum with the surface functional material, The invention also comprises the product produced by the process described above.

Microparticles of the present invention are spherical globules of gellan gum surrounded with an oil coating. The microparticles are useful as fat extenders or fat replacers in foods which normally contain fat and/or oil, either partially or completely replacing the fat or oil normally present in the food product. Optionally, surface functional materials are contacted with the hydrophobic oil coat, forming another layer which modifies the properties of the microparticles to facilitate incorporation of the microparticle into certain food products, such as those where the food product contains substantial amounts of hydrophilic components.

In the following description, oil-coated microparticulated gellan gum is abbreviated "MPG." MPG which is modified with a surface functional material is abbreviated to indicate the specific surface functional material present (e.g., MPG modified with KELTROL® SF xanthan gum is referred to below as MPG:SF; MPG modified with propylene glycol alginate is referred to below as MPG:PGA, etc.)

Gellan gum is a heteropolysaccharide prepared by fermentation of *Pseudomonas elodea* ATCC 31461. Gellan gum is available from Kelco Division of Merck & Co., Inc., under various names, including KELCOGEL, KELCOGEL PC, and KELCOGEL F. Processes for preparing gellan gum include those described in U.S. Pat. Nos. 4,326,052 and 4,326,053. It is useful for a variety of gelling, texturizing, stabilizing and film forming applications, particularly as a gelling agent in foods, personal care products and industrial applications. KELCOGEL PC consists of 80% KELCOGEL F fine mesh gellan gum and 20% fine mesh sodium citrate.

Any conventional edible oil can be used to prepare the microparticles of the present invention, including canola oil, soybean oil, corn oil, coconut oil, cottonseed oil, olive oil, palm oil, peanut oil, rapeseed oil, safflower oil, sesame oil, and sunflower oil. Edible fats having relatively high melting points, such as highly unsaturated fats, can be used instead of or in addition to edible oil for coating the gellan gum globule.

Surface functional materials which are suitable for modifying the microparticles of the invention are those which provide the microparticle with physical properties, e.g. degrees of hydrophilicity, necessary to properly incorporate the microparticle into the food product of interest. These include, but are not limited to, alginates, gums, such as xanthan gum, and proteinaceous materials.

Suitable alginates include propylene glycol alginates, which are water-soluble, hydrophilic colloids typically used as secondary emulsifiers to thicken and stabilize food and pharmaceutical systems. For such purposes, alginates provide a range of viscosities from very low to very high, depending on type and concentration. These alginates combine emulsifying and thickening properties to provide excellent emulsion stability with good body. Propylene glycol alginates are useful in acidic solutions, since they are soluble and stable in solutions of pH 3.0 to 6.0. Specific food applications include syrups, sauces, icings, frozen foods, salad dressings, relish, batters, citrus concentrates and food emulsions. Propylene glycol alginates are commercially available from Kelco, Division of Merck & Co., Inc., San Diego, Calif., under product names KELCOLOID®HVF, KELCOLOID®LVF, KELCOLOID®DH, KELCOLOID®S, and KELCOLOID®O.

Xanthan gum is an extracellularly produced gum made by the heteropolysacchafide-producing bacterium *Xanthornonas campestris* by whole culture fermentation of medium comprising a fermentable carbohydrate, a nitrogen source and other appropriate nutrients. Examples of commercially available xanthan gum are KELTROL®T, KELTROL®F, KELZAN®AR, KELTROL®SF, and KELZAN®, available from Kelco Division of Merck & Co., Inc. Processes for producing xanthan gum are described in a number of patents including U.S. Pat. Nos. 4,316,012, 4,352,882 and 4,375,512.

Suitable proteins include, but are not limited to, whey, soy, egg, milk, or casein proteins.

Physical properties

The size and shape of oil-coated microparticulated gellan gum was measured using a high-power microscope system equipped with a micrometer grid. Most particles have a diameter in the range of about 0.1–10 microns. About 70–80% are in the range of 0.1–5 microns. The shape of the microparticles, as seen under the microscope, is substantially spherical.

The microparticles have a high degree of deformability, as measured by analyzing compression forces imparted by an Instron measuring instrument.

The oil-coated microparticles have a high degree of hydrophobicity. The degree of hydrophobicity can be altered by treating the oil coating with a surface active material as described above.

Preparation

The microparticles of the present invention are prepared using a microfluidizer (Microfluidizer™, commercially available from Microfluidics Corporation, Newton, Mass.) which converts oil and conventional commercially available gellan gum into an oil-coated microparticulate material having an exceptionally high degree of small particle size uniformity. In the past, microfluidizers have been used on finished products to provide stable emulsions, extended shelf life, and improved mouthfeel, of salad dressings, sauces and gravies, UHT milk, syrups, chocolate and malted drinks, flavor oil emulsions, high-butterfat dairy products, creams, yogurts, fillings, and icings.

Hot oil and hot gellan gum solution are simultaneously introduced into the microfluidizer which is operated between about 8,000 and 10,000 psi. Following formation of the gellan gum globule and the oil-coating around the globule, excess oil is removed via centrifugation. The excess oil can be recycled into the microfluidizer. The oil-coated gellan gum globules may then be used as a fat extender or fat replacer, preferably as a fat extender.

The oil coated globules can be further treated to modify the properties of the surrounding coating, by applying to the oil coating a surface functional material via conventional blending techniques. The resulting blend may be used as a fat extender or replacer, preferably as a fat replacer.

These microparticulates can be used for a wide range of applications, including as food additives with differing mouth feel sensations and with incorporated flavoring and coloring agents and nutrients by replacement of a portion of the aqueous phase with an appropriate material. Compositions containing microparticulated gellan gum contain amounts in the weight range between about 5–25%, preferably 10–15%, depending on the type of food product.

Products which can advantageously exploit the fat substitute characteristics of microparticulated gellan gum include, but are not limited to, milk products, ice cream, pudding, cheese, cheesecake, chocolate, fondues, dips, salad dressings, mousse, frosting and icing, confections, sauces and gravies, desserts, and mayonnaise.

Another important application of the microparticulates produced in accordance with the invention is in the encapsulation of drugs (for example to allow delayed drug release) or of microorganisms or enzymes. Gelling agents such as alginates have previously been used in encapsulation by extending a fluid gellable composition containing the material to be encapsulated through a hollow needle or fine orifice. The resulting beads are relatively large, often up to 0.1 or 0.2 mm in diameter. The very small diameter and relatively uniform size distribution of the oil-coated microparticulated gellan gum of the present invention confer particular advantages in respect of the transport of nutrient materials and gases, such as oxygen, through the beads. These are important factors for the longevity of encapsulated microorganisms. Moreover, the rapid gelation achieved with the method of the invention at very small particle sizes minimizes any harmful effect of the technique on microorganisms or other sensitive encapsulated material.

Examples 1 and 2 describe procedures for making microparticulated gellan gum. Example 3 describes a comparative study, supported by sensory panelist data, comparing MPG-containing salad dressing with a commercially available salad dressing and with salad dressings containing alterative fat replacers. Example 4 decribes a comparative study comparing MPG-containing nacho cheese sauce with sauces having other fat substitutes. Examples 5–12 describe other food compositions containing MPG.

The following names are registered or pending trademarks: LITESSE™ (Pfizer, Inc.), AVICEL® (FMC Corporation), SLENDID® (Hercules Inc.), STELLAR® (A. E. Staley Manufacturing Co.), WISHBONE® (Thomas J. Lipton, Inc.), and SIMPLESSE® (The Simplesse Co.).

EXAMPLE 1

The following solutions are prepared:

|  | WT. % |
|---|---|
| KELCOGEL solution | |
| KELCOGEL F | 2.5 |
| Calcium chloride dehydrate (0.3M soln.) | 2.0 |
| Sodium benzoate | 0.1 |
| Deionized water | 95.4 |
|  | 100.0 |
| Oil solution | |
| Corn oil | 99.50 |
| Span 60 emulsifier | 0.50 |
|  | 100.0 |

Procedure

Water was placed in a hot cup and sodium benzoate was added. KELCOGEL F was added under high shear to disperse, the solution was heated to 85° C., and calcium chloride was added. The temperature was maintained at 85° C.

Oil was placed in a hot cup and heated to 60° C. under low shear. Emulsifier was added and mixing continued under low shear. Temperature was maintained at 60° C.

The microfluidizer (Microfluidizer™, commercially available from Microfluidics Corporation, Newton, Mass.) was set up for dual feed. The settings were adjusted so that pressure was maintained between about 8,000 and 10,000 psi. Pump speed was set at 1.25 or 1.5. KELCOGEL solution and Oil solution were added simultaneously. Gellan gum globules were formed and coated with oil introduced by the Oil solution.

The oil-coated microparticles were refrigerated to allow excess oil to separate. Oil was decanted, and the remaining product was centrifuged at 2,500 rpm for 6 minutes.

The final product oil-coated microparticulated gellan gum is referred to as "MPG"

EXAMPLE 2

Three modified MPG products were prepared The following surface functional materials were used.

2a) KELTROL SF - A 50:50 blend of KELTROL SF xanthan gum and MPG (prepared in Example 1 ) was prepared by blending MPG with KELTROL SF and mixing for 20–30 minutes. The final product was referred to as MPG:SF.

2b) KELCOLOID LVF - A 50:50 blend of KELCOLOID LVF propylene glycol alginate (PGA) and MPG (prepared in Example 1) was prepared by blending MPG with KELCOLOID LVF and mixing for 20–30 minutes. The final product was referred to as MPG:PGA.

2c) KELTROL T and KELCOLOID LVF - The following solution was prepared:

| KELTROL T solution | WT. % |
|---|---|
| Tap water | 96.9 |
| KELTROL T | 2.0 |
| KELCOLOID LVF | 1.0 |
| Sodium benzoate | 0.1 |
|  | 100.0 |

Water and sodium benzoate were added to a mixing vessel. KELTROL T was blended with KELCOLOID LVF under high agitation. The blend was mixed at high speed (@ 2000 rpm) for 60 minutes to fully hydrate the gums. The solution can be stored in a refrigerator.

A 50:50 blend of KELTROL T solution and MPG was prepared under high shear (@ 1000 rpm) and mixed for 20–30 minutes.

EXAMPLE 3

Salad dressings were prepared using Simpless, Avicel Slendid, and Stellar, each combined with KELTROL SF, Simpless, Avicel Slendid, and Stellar, each combined with KELCOLOID LVF, MPG:SF, and MNPG:PGA. The complete formulations are shown below:

| Ingredient | MPG | Stellar | Simplesse | Avicel | Slendid |
|---|---|---|---|---|---|
| Water | 44.47 | 45.97 | 45.72 | 52.72 | 47.70 |
| Fat Replacer | 10.00 | 9.00 | 9.00 | 2.00 | 7.00 |
|  |  |  |  |  | 0.025 Pectin |
| Starch Mirathick 468 | 1.50 | 1.00 | 1.25 | 1.25 | 1.25 |
| PGA (Kelcoloid LVF) | 0.8 | 0.8 | 0.8 | 0.8 | 0.8 |
| Buttermilk | 30.00 | 30.00 | 30.00 | 30.00 | 30.00 |
| Oil | 1.00 | 1.00 | 1.00 | 1.00 | 1.00 |
| Vinegar | 1.60 | 1.60 | 1.60 | 1.60 | 1.60 |
| Lactic Acid | 0.18 | 0.18 | 0.18 | 0.18 | 0.18 |
| Lemon Juice Conc. | 0.19 | 0.19 | 0.19 | 0.19 | 0.19 |
| Sorbic Acid | 0.50 | 0.50 | 0.50 | 0.50 | 0.50 |
| Salt | 0.10 | 0.10 | 0.10 | 0.10 | 0.10 |
| Sugar | 4.00 | 4.00 | 4.00 | 4.00 | 4.00 |
| Buttermilk Flavor | 0.20 | 0.20 | 0.20 | 0.20 | 0.20 |
| Onion Powder | 0.05 | 0.05 | 0.05 | 0.05 | 0.05 |
| Garlic Powder | 0.05 | 0.05 | 0.05 | 0.05 | 0.05 |
| McCormick Spice | 2.83 | 2.83 | 2.83 | 2.83 | 2.83 |
| Griffith Spice 858-0092 | 2.83 | 2.83 | 2.83 | 2.83 | 2.83 |
| Total | 100.00 | 100.00 | 100.00 | 100.00 | 100.00 |
| Water | 44.47 | 45.97 | 45.72 | 52.72 | 47.70 |

-continued

| Ingredient | MPG | Stellar | Simplesse | Avicel | Slendid |
|---|---|---|---|---|---|
| Fat Replacer | 10.00 | 9.00 | 9.00 | 2.00 | 7.00 |
|  |  |  |  |  | 0.025 Pectin |
| Keltrol SF | 0.50 | 0.50 | 0.50 | 0.50 | 0.50 |
| Buttermilk | 30.00 | 30.00 | 30.00 | 30.00 | 30.00 |
| Oil | 1.00 | 1.00 | 1.00 | 1.00 | 1.00 |
| Vinegar | 1.60 | 1.60 | 1.60 | 1.60 | 1.60 |
| Lactic Acid | 0.18 | 0.18 | 0.18 | 0.18 | 0.18 |
| Lemon Juice Conc. | 0.19 | 0.19 | 0.19 | 0.19 | 0.19 |
| Sorbic Acid | 0.50 | 0.50 | 0.50 | 0.50 | 0.50 |
| Salt | 0.10 | 0.10 | 0.10 | 0.10 | 0.10 |
| Sugar | 4.00 | 4.00 | 4.00 | 4.00 | 4.00 |
| Buttermilk Flavor | 0.20 | 0.20 | 0.20 | 0.20 | 0.20 |
| Onion Powder | 0.05 | 0.05 | 0.05 | 0.05 | 0.05 |
| Garlic Powder | 0.05 | 0.05 | 0.05 | 0.05 | 0.05 |
| McCormick Spice | 2.83 | 2.83 | 2.83 | 2.83 | 2.83 |
| Griffith Spice 858-0092 | 2.83 | 2.83 | 2.83 | 2.83 | 2.83 |
| Total | 100.00 | 100.00 | 100.00 | 100.00 | 100.00 |

Sensory evaluations were performed to measure consumer preference for MPG:SF and MPG:PGA versus other common fat replacers and versus commercially available WISH-BONE salad dressing, which was used as a control.

Twelve sensory panelists scored desirable "oily" characteristics (the desirable taste and mouthfeel characteristics commonly associated with fat-containing foods) of salad dressings prepared with the various fat replacers. The relative scores shown below indicate that MPG, in combination with either xanthan gum or propylene glycol alginate, was preferred to every other fat substitute, and was preferred to commercially available WISH-BONE salad dressing.

| Fat replacer | Oily mouthfeel score |
|---|---|
| MPG:SF | 21.77 |
| MPG:PGA | 21.70 |
| Simpless with PGA | 21.47 |
| Stellar with PGA | 21.17 |
| Avicel with PGA | 19.70 |
| Simpless with KELTROL SF | 19.80 |
| Slendid with PGA | 17.90 |
| WISH-BONE salad dressing | 15.40 |
| Slendid with KELTROL SF | 15.30 |
| Avicel with KELTROL SF | 14.17 |
| Stellar with KELTROL SF | 13.47 |

EXAMPLE 4

Nacho Cheese Sauce

In order to evaluate the fat-like properties of microparticulated gellan gum, low-fat nacho cheese sauces including one of the fat substitutes Simplesse 100, Litesse, B-glucan, and MPG, were prepared. The formulations (grams) are shown below.

| Ingredient | 1a | 1b | 1c | 1d | 1e |
|---|---|---|---|---|---|
| Water | 146.16 | 146.16 | 146.16 | 146.16 | 146.16 |
| Velveeta Cheese | 105.0 | 105.0 | 105.0 | 105.0 | 105.0 |
| Corn oil | 4.2 | 4.2 | 4.2 | 4.2 | 4.2 |
| Whey Solids | 27.09 | 27.09 | 27.09 | 27.09 | 27.09 |
| Jalepenos | 6.0 | 6.0 | 6.0 | 6.0 | 6.0 |
| Salt | 2.19 | 2.19 | 2.19 | 2.19 | 2.19 |
| Lactic acid | 3.75 | 3.75 | 3.75 | 3.75 | 3.75 |
| Xanthan/Guar | 1.25 | 1.25 | 1.25 | 1.25 | 1.25 |

-continued

| Ingredient | 1a | 1b | 1c | 1d | 1e |
|---|---|---|---|---|---|
| Gum Blend (KOB87) |  |  |  |  |  |
| Starch (Mira-Thik 469) | 6.5 | 6.5 | 6.5 | 7.0 | 7.0 |
| Sorbic acid | 0.3 | 0.3 | 0.3 | 0.3 | 0.3 |
| Simplesse 100 | 4.5 | — | — | — | — |
| Litesse | — | 6.0 | — | 7.0 | — |
| B-Glucan | — | — | 3.0 | — | — |
| MPG | — | — | — | — | 6.0 |

Procedure

1. Dry blend KOB87, Mira-Thik 469 and whey solids. Disperse in water using medium shear. Agitate for 5 minutes to allow gums to hydrate.

2. Add velveeta spread and oil and heat to 155 degrees F.

3. Add lactic acid, salt, and sorbic acid. Hold at 155 degrees F. for 5 minutes.

4. Add jalepeno peppers and mix thoroughly. Allow to cool.

Results 1a was pink and felt thin in the mouth. 1b had good body and creaminess. 1c had a very thin feel in the mouth. 1d was gritty. 1e had good body and creaminess.

EXAMPLE 5.

Salad Dressing

| INGREDIENT | WT % |
|---|---|
| Water | 32 |
| Olive Oil | 40 |
| MPG | 15 |
| Eggs | 10 |
| Vinegar | 3 |

Water and eggs are thoroughly mixed in a food processor before adding the oil under maximum shear. Vinegar is then blended into the mixture under conditions of maximum shear. The mixing conditions are slowed and MPG is gently introduced. The premixed material is then introduced into the throat of a conventional colloid mill. A mayonnaise type product is formed with approximately half the fat content of a conventional mayonnaise.

EXAMPLE 6

Milk Product

| INGREDIENT | WT % |
|---|---|
| Skimmed milk | 85 |
| Eggs | 5 |
| MPG | 10 |

Eggs are blended with the skimmed milk using a Silverson food processor. MPG is then blended in using the emulsion head of a Silverson mixer. The blended material is fed into a pressure homogenizer. Two passes through the homogenizer gives a creamy milk drink with a negligible dairy fat content.

EXAMPLE 7

This example is a variation of Example 6 but with a malt flavor provided by introducing 10% malt into the aqueous phase.

EXAMPLE 8

Ice Cream Product

| Conventional | WT. % |
|---|---|
| Cream | 26.4 |
| Skimmed milk powder | 4.5 |
| Skimmed milk | 52.5 |
| Granulated sugar | 12.1 |
| Corn syrup | 4.0 |
| Stabilizer & Emulsifier | 0.5 |
| | 100.0 |

The dry ingredients (i.e. sugar and skimmed milk powder) are mixed together. The liquid milk, cream and corn syrup are mixed together in a second container. The dry ingredients are then added to the wet mixture using (e.g.) a high speed Silverson mixture till a smooth mix is obtained. The stabilizer and emulsifier is then added into the vortex and mixed through. The mixture is then heated to about 80° C. for 30 minutes. The mixture is then homogenized by a double pass through an ice cream homogenizer (e.g. APV Gaulin) at 3.45 MNM$^{-2}$ (500 psi) for the first pass and subsequently at 17:24 MNM$^{-2}$ (2500 psi) for the second pass. The mixture is then allowed to age for upwards of 12 hours in the freezer.

This process gives an ice cream containing about 10% milk fat.

| Reduced Fat | WT. % |
|---|---|
| Cream | 10.9 |
| MPG | 6.3 |
| Skimmed milk powder | 65.4 |
| Granulated sugar | 12.7 |
| Corn syrup | 4.2 |
| Emulsifier & Stabilizer | 0.5 |

| Reduced Fat | WT. % |
|---|---|
| | 100.0 |

The dry ingredients are blended as described above. The skimmed milk, corn syrup and MPG are blended in a second container. The dry ingredients are subsequently mixed with the contents of the second container and blended as described above in (a). The remainder of the process is as described in (a).

In both examples the emulsifier and stabilizer is a proprietary food grade blend sold for the purpose of ice cream manufacture.

EXAMPLE 9

MPG is incorporated into skim milk at various levels to demonstrate their functionality in a simple system. MPG is added to skim milk at 4%, 10%, 20%, 30% and 40%. A high shear mixer is used to disperse the MPG. The mixture is then homogenized with a two-stage homogenizer at 6000 psi (41.4MN/m$^2$).

EXAMPLE 10

Cheese Cake Filling

| INGREDIIENT | WT. % |
|---|---|
| (Mix A) | |
| Cream Cbeese | 45.5 |
| MPG | 25.00 |
| Glycerin | 2.5 |
| (Mix B) | |
| Sucrose | 23.0 |
| Starch | 2.6 |
| Emulsifier | 0.2 |
| Cheese Cake Flavor | 0.2 |
| Salt | 0.3 |
| B-Carotene | 0.01 |
| Vanilla | 0.7 |

The cheese cake is prepared by creaming the ingredients of mix A using a Hobart mixer. Mix B is blended together and slowly added to mix A until smooth. The mixture is then heated for approximately 9 minutes in a microwave oven until a temperature of 190° C. is obtained. The cheese cake filling is held at room temperature for 5 minutes allowing the starch to gelatinize. The product is cooled to 100° C. in a water bath, followed by the addition of the vanilla. It is then refrigerated for later sampling.

The final product thus produced is a reduced fat cheese cake filling with the positive attributes of an increased texture and mouth coat.

EXAMPLE 11

Example 10 is repeated except that MPG forms 30% of the mixture, with the cream cheese correspondingly reduced. The final product thus produced is a much lower fat cheese cake filling with the positive attributes of an increased texture and mouth coat, and a slower melt.

EXAMPLE 12

Chocolate

Following tempering, MPG is added to chocolate at 25% to formulate a low-fat chocolate snack. The final product thus produced is higher in viscosity and resembles that of a fudge-type product.

A lower level, 2%, is added to chocolate as a means of incorporating water into the chocolate system. The heat stability of the chocolate sample is greatly increased, without increasing the viscosity.

EXAMPLE 13

Mayonnaise

The reduced fat mayonnaise was prepared having the following composition:

| INGREDIENT | WT. % |
|---|---|
| Whole egg | 11.04 |
| Salt | 1.04 |
| Sugar | 1.43 |
| Mustard | 0.43 |
| Vinegar | 12.93 |
| MPG | 35.07 |
| Oil | 38.07 |

The mayonnaise is prepared by mixing the egg, salt, sugar, MPG and dry mustard. Haft the vinegar is added to the egg mixture, and stirred well to dissolve the sugar and disperse the alginate. Using a lightening mixer at speed 2000, half the oil is added and mixed for 3 minutes. The remaining oil is added and mixed at speed 1300 for 30 seconds. The remaining vinegar is added and mixed at 2000 for 3 minutes. The final product is refrigerated for later evaluation.

The final product thus produced is a creamy mayonnaise with 50% less than regular mayonnaise.

What is claimed is:

1. A composition comprising substantially spherical oil-coated microparticles, wherein between about 70–80% of the microparticles have particle size diameters between about 0.1–5.0 microns, and wherein the microparticles consist essentially of gellan gum.

2. A composition of claim 1 wherein the oil-coated gellan gum microparticles have one or more surface functional materials adhering to the oil coat.

3. A composition of claim 2 wherein the surface functional material is selected from the group consisting of xanthan gum, propylene glycol alginate, and a proteinaceous material.

4. A composition of claim 3 wherein the surface functional material is xanthan gum.

5. A composition of claim 3 wherein the surface functional material is propylene glycol alginate.

6. A composition of claim 3 wherein the surface functional material is xanthan gum or propylene glycol alginate.

7. A composition of claim 3 wherein the surface functional material is a proteinaceous material.

8. A low-fat food product comprising about 5–25% oil-coated gellan gum microparticles of claim 1.

9. A low-fat food product comprising about 10–15 % oil-coated gellan gum microparticles of claim 1.

10. A low-fat food product comprising about 5–25% oil-coated gellan gum microparticles, having one or more surface functional materials adhering to the oil coat, of claim 2.

11. A low-fat food product comprising about 10–15% oil-coated gellan gum microparticles, having one or more surface functional materials adhering to the oil coat, of claim 2.

12. A process for preparing oil-coated gellan gum microparticles consisting essentially of gellan gum comprising:
 a) simultaneously introducing oil and gellan gum solution into a microfluidizer operated at a pressure between about 8,000 and 10,000 psi.;
 b) forming gellan gum microparticulates and coating the gellan gum microparticulates with oil; and
 c) removing excess oil.

13. A process for preparing oil-coated gellan gum microparticles, consisting essentially of gellan gum having one or more surface functional materials adhering to the oil coat, comprising:
 a) simultaneously introducing oil and gellan gum solution into a microfluidizer operated at a pressure between about 8,000 and 10,000 psi.;
 b) forming gellan gum microparticulates and coating the gelan gum microparticulates with oil to form an oil-coated microparticulated gellan gum composition;
 c) removing excess oil; and
 d) applying a surface functional material to the oil coating by blending oil-coated microparticulated gellan gum with the surface functional material.

14. A product prepared according to the process of claim 12.

15. A product prepared according to the process of claim 13.

* * * * *